(12) United States Patent
Morein et al.

(10) Patent No.: US 7,336,284 B2
(45) Date of Patent: Feb. 26, 2008

(54) TWO LEVEL CACHE MEMORY ARCHITECTURE

(75) Inventors: Stephen L. Morein, Cambridge, MA (US); Michael Doggett, Southborough, MA (US)

(73) Assignee: ATI Technologies Inc., Markham, Ontario (CA)

( * ) Notice: Subject to any disclaimer, the term of this patent is extended or adjusted under 35 U.S.C. 154(b) by 107 days.

(21) Appl. No.: 10/820,580

(22) Filed: Apr. 8, 2004

(65) Prior Publication Data

US 2005/0225558 A1 Oct. 13, 2005

(51) Int. Cl.
*G06T 11/40* (2006.01)
*G09G 5/00* (2006.01)
*G09G 5/36* (2006.01)

(52) U.S. Cl. .................. 345/552; 345/582; 345/557

(58) Field of Classification Search ............... 711/128; 345/545, 552, 557, 582, 506
See application file for complete search history.

(56) References Cited

U.S. PATENT DOCUMENTS

| 6,195,106 | B1 * | 2/2001 | Deering et al. ............. 345/545 |
| 6,825,848 | B1 * | 11/2004 | Fu et al. ...................... 345/557 |
| 6,889,291 | B1 * | 5/2005 | Palanca et al. ............. 711/128 |

* cited by examiner

*Primary Examiner*—Kee M. Tung
*Assistant Examiner*—Hau H Nguyen
(74) *Attorney, Agent, or Firm*—Vedder, Price, Kaufman & Kammholz, P.C.

(57) ABSTRACT

A memory architecture for use in a graphics processor including a main memory, a level one (L1) cache and a level two (L2) cache, coupled between the main memory and the L1 cache is disclosed. The L2 cache stores overlapping requests to the main memory before the requested information is stored in the L1 cache. In this manner, overlapping requests for previously stored information is retrieved from the faster L2 cache as opposed to the relatively slower main memory.

11 Claims, 5 Drawing Sheets

TWO LEVEL CACHE MEMORY ARCHITECTURE

FIELD OF THE INVENTION

The present invention generally relates to memory structures and, more particularly, to a memory architecture for use in graphics processors.

BACKGROUND OF THE INVENTION

In computer graphics applications, complex shapes and structures are formed through the sampling, interconnection and rendering of simple objects, referred to as primitives. An example of such a primitive is a triangle or other suitable polygon. These primitives, in turn, are formed by the interconnection of individual pixels. Color and texture attributes, for example, are then applied to the individual pixels that comprise the generated shape in order to make the resulting rendered object look more realistic.

The interconnection of primitives and the application of color and texture to generated shapes are operations generally performed by a graphics processor. Within the graphics processor, the appearance attributes (i.e. color, texture, etc.) provided to a particular pixel or group of pixels are generated through the application of data obtained from a corresponding map. For example, the texture to be applied to a corresponding object is generally obtained from a texture map. The color to be applied to a corresponding pixel is generally obtained from a color map. Such texture and color maps are generally maintained in a larger main memory. Thus, accessing texture and color data requires that a memory access operation be performed.

When performing a memory access operation, a request is generated by the graphics processor and transmitted to the applicable memory. In turn, the requested information is transmitted from the memory to the requesting graphics processor. This request and transfer combination is carried out each time an appearance attribute needs to be acquired. A drawback associated with the aforementioned memory access/transfer combination is that a large memory bandwidth is required. This is a result of that fact that every time an appearance attribute is required, a separate memory request is generated. Thus, for example, applying the same color value to neighboring pixels requires two separate memory requests and subsequent transfers. With a large number of pixels or a large shape requiring the application of appearance attributes thereto, the amount of time spent accessing main memory and transferring data therefrom becomes prohibitive.

BRIEF DESCRIPTION OF THE DRAWINGS

The present invention and the associated advantages and features provided thereby will be best understood and appreciated upon review of the following detailed description of the invention, taken in conjunction with the following drawings, where like numerals represent like elements, in which.

DETAILED DESCRIPTION OF THE INVENTION

Briefly stated, the present invention is directed to a memory architecture comprising, a main memory; a level one (L1) cache, coupled to the main memory, for maintaining information; and a level two (L2) cache, coupled between the main memory and the level one (L1) cache. The L2 cache captures overlapping requests to the main memory and the corresponding data provided thereby for subsequent use; thereby, reducing the external memory bandwidth requirements of a corresponding graphics processor. By storing the data associated with overlapping memory requests, a subsequent request for previously requested information can be quickly obtained from the L2 cache, instead of having to use valuable processing time obtaining the same information from the main memory. In this fashion, the memory bandwidth of the corresponding graphics processor is reduced. As the memory is the most expensive and time consuming portion of a graphics processor, reducing the memory bandwidth results in greater operating efficiency and also reduces the size and corresponding cost of the graphics processor.

In application, when an appearance attribute needs to be acquired, a fetch request for such attribute is generated by the graphics processor. The fetch request first checks the corresponding L1 cache for the requested attribute data. If the requested attribute data is not located in the L1 cache, the L2 cache is subsequently checked for the requested attribute data. If the requested attribute data is present within the L2 cache, such data is transferred to the requesting processor. Otherwise, the requested attribute data is retrieved from main memory and first stored in the L2 cache, then the corresponding L1 cache before being transmitted to the requesting processor. In this fashion, a subsequent request for such data will be present at least in the L2 cache. Accordingly, any subsequent or overlapping request can be quickly handled by the L2 cache. Consequently, processing time will not have to be used accessing the slower main memory.

The present invention will now be described with reference to FIGS. 1-5, in conjunction with a graphics processor employing bilinear filtering to determine the appearance attributes of pixels. In bilinear filtering, the appearance attribute (e.g. color) of a given pixel is determined, at least in part, by the corresponding appearance attributes of neighboring pixels (e.g. color values of texels in a color map). Thus, when requesting information relating to the color of a particular pixel of interest, the corresponding color information of a plurality of neighboring pixels is also obtained and used to determine the color associated with the pixel of interest.

Figure 1:
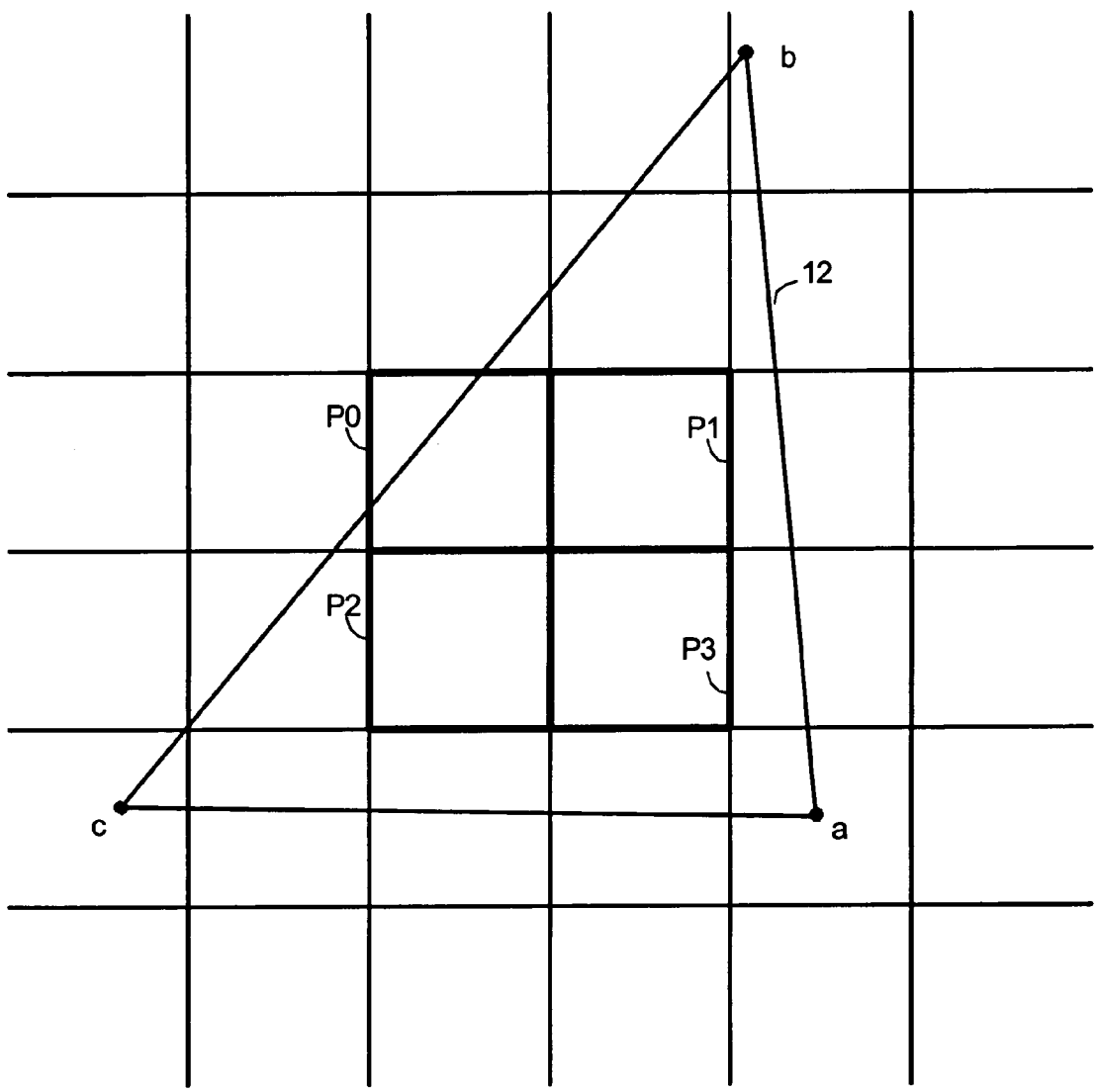
FIG. 1 is a schematic representation of a portion of a screen where final pixel appearance values are rendered.
Figure 2:
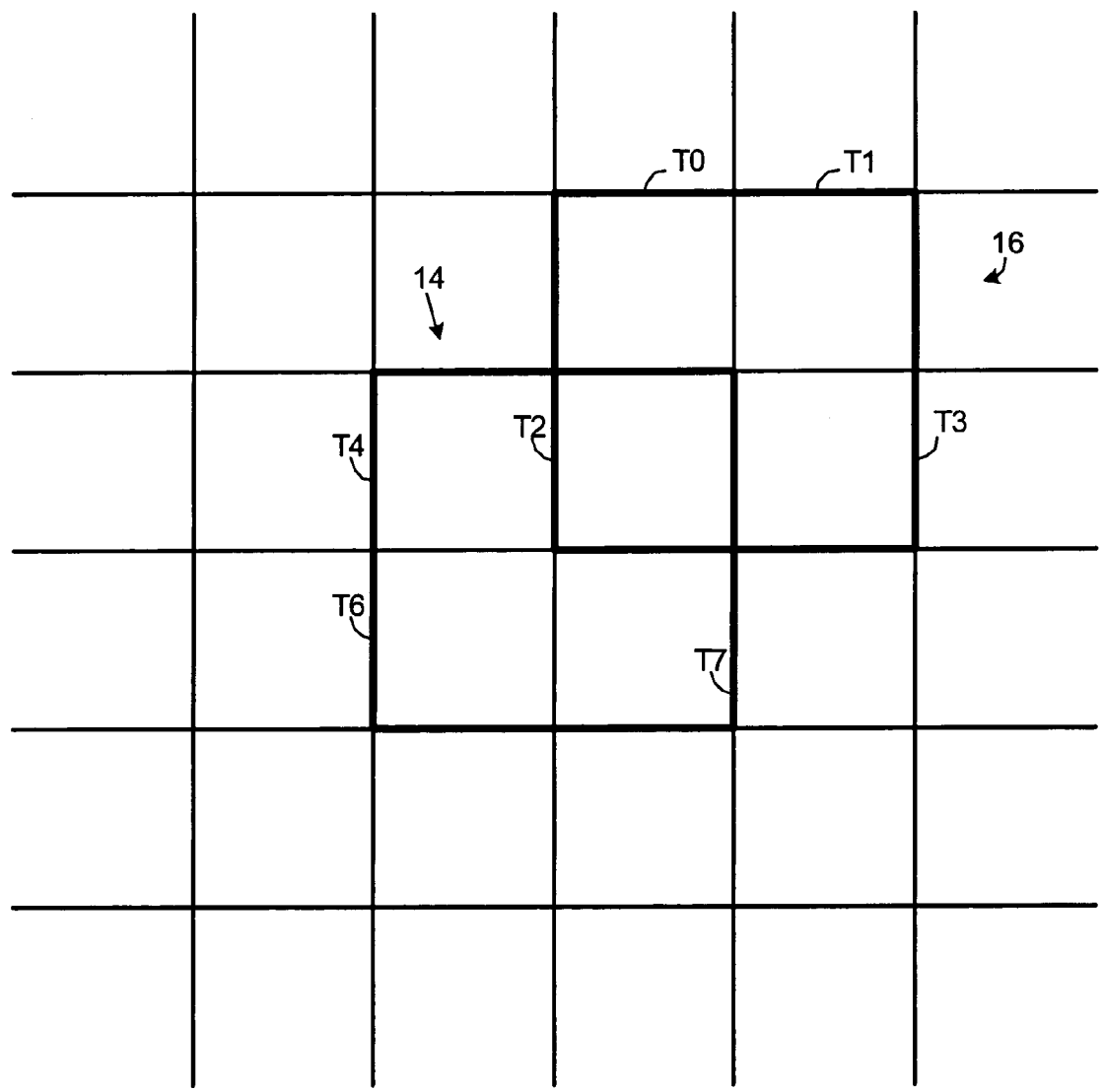
FIG. 2 is a schematic representation of a portion of a color memory used in determining the appearance of a pixel to be rendered.

FIG. 1, is a schematic representation of a portion of the screen 10 where final pixel colors are located. FIG. 2, is a schematic representation of a portion of a color memory 11 used to determine the color of a pixel of interest. As shown in FIG. 1, a primitive 12 is defined by a series of vertices (a, b, c). The vertices define the outline of a region that is filled with pixels (P0-P3). Each of these pixels (P0-P3) is associated with a color. To determine the color at each pixel, a group of color values are fetched from the color memory 11 and used as an input to a bilinear filter (not shown) to determine a color for each pixel. In bilinear filtering, to determine the color value associated with pixel P0, for example, the corresponding color values associated with texture tile 14 (FIG. 2) are used. More specifically, to determine the color value of pixel P0, the corresponding color information (e.g. texels T2, T4, T6 and T7) contained within texture tile 14 is used.

In similar fashion, the color associated with pixel P1 is determined by the series of neighboring texel colors within texture tile 16. More specifically, the color associated with pixel P1 is determined, at least in part, by the color values associated with neighboring texels (T0, T1, T2 and T3) of texture tile 16. Thus, the determination of the color value associated with pixel P1 will require the accessing of information contained in texels T0, T1, T2 and T3. In this manner the information contained in texel T2 is used to determine the color of both pixel P0 and pixel P1. Thus, texel T2 is referred to as an overlapping texel and consecutive requests for the color value maintained therein is referred to as an overlapping request.

Figure 3:
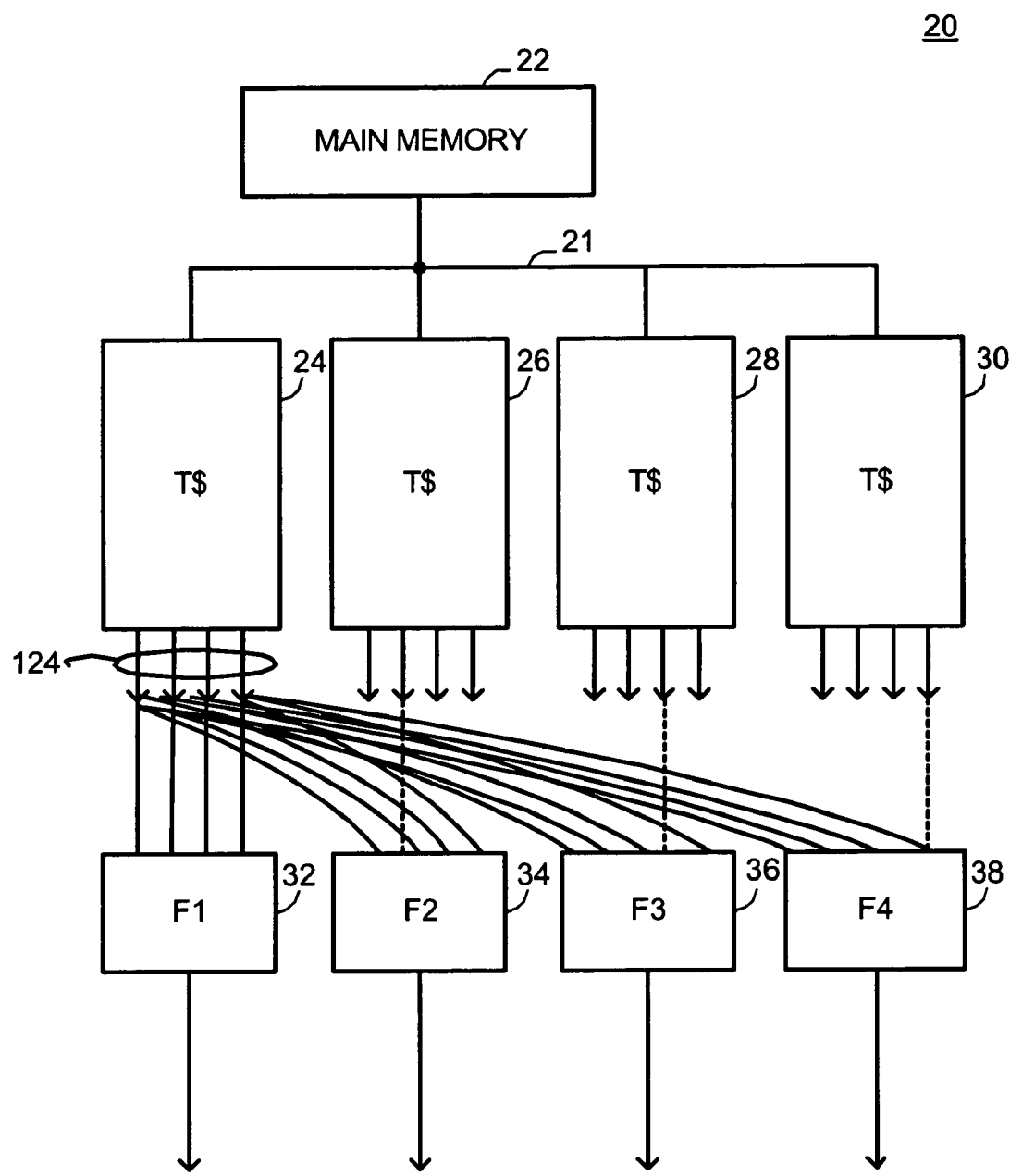
FIG. 3 is a schematic representation of a memory architecture employed in conventional graphics processors.

Referring now to FIG. 3, illustrated therein is a schematic block diagram of a memory architecture employed in conventional graphics processors. The conventional memory structure 20 includes a main memory 22, which can be an on-chip memory or an off-chip memory containing a texture map similar to that illustrated and discussed above with reference to FIG. 2. Additionally, the memory structure 20 includes a series of texture caches 24-30, which comprise a level one (L1) cache structure. Each of the corresponding texture caches 24-30 contain the same elements, therefore only texture cache 24 will be described in greater detail hereinafter.

Texture cache 24 includes a plurality of pins 124 which provide information contained therein to a series of fetch blocks or processes 32-38. The fetch blocks may be part of a larger graphics controller (not shown) or other suitable device. More specifically, texture cache 24 includes four lines, with each line configured to transfer one bit of information. Each line is coupled to respective fetch blocks 32-38; thereby establishing a maximum of four bits of information being accessed or transmitted per clock cycle. In operation, if a first fetch process 32 requests color attribute data for pixel P0 (FIG. 1), such a request would first be sent to the associated texture cache 24. If the texture cache 24 does not contain the requested color information for pixel P0, a request for such information would then be made to the main memory 22. Main memory 22 then transmits the requested information to one of the plurality of texture caches 24-30, which then transmits the requested information to the requesting fetch process 32. As discussed above, accessing the main memory 22 is a relatively slow process. Consequently, valuable processor time goes unused while waiting for the transfer of appropriate information from the main memory 22, through the L1 cache and to the requesting fetch process 32.

Next, a second fetch process 36 requests color information for pixel P1. As bilinear filtering is being employed, this requires the collection of color data from texels T0, T1, T2 and T3. As the information relating to the aforementioned pixels is not permanently maintained, the second fetch process 36 sends a request to main memory 22 for the associated pixel information. As the color data associated with pixel P0 has previously been requested by first fetch process 32, the request for information relating to pixel P0 is considered an overlapping request. In a graphics processor containing several interconnected versions of the memory architecture illustrated in FIG. 3, several requests for the same information will quickly overburden and degrade the performance of the main memory 22. In addition, valuable processor time is being wasted as the main memory 22 is required to transmit identical information to at least two different fetch processes. The memory architecture of the present invention overcomes such limitations and the corresponding problems associated therewith by providing more time efficient access to overlapping requests.

Figure 4:
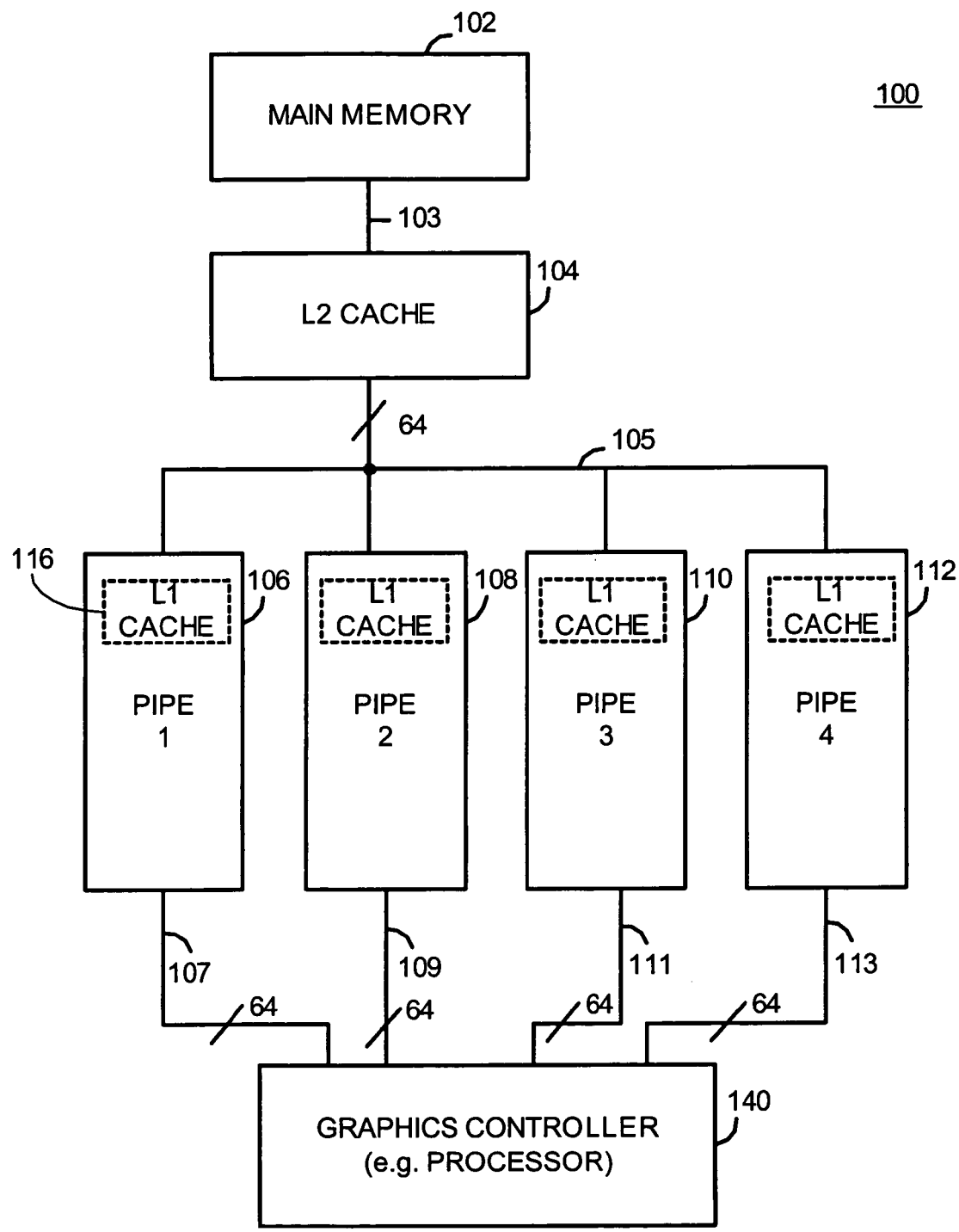
FIG. 4 is a schematic block diagram of a graphics processor employing the two level cache architecture according to the present invention.

Referring now to FIG. 4, illustrated therein is a schematic block diagram of the two level cache memory architecture 100 for use in a graphics processor according to the present invention. In an exemplary embodiment, a graphics controller 140, which may be implemented in and illustrated as a processor, is connected to a plurality of pipelines 106-112 which each comprise a level one (L1) texture cache 116 as discussed in greater detail below. More specifically, graphics controller 140 is coupled to a first pipeline 106 via line 107; to a second pipeline 108 via line 109; to a third pipeline 110 via line 111 and to a fourth pipeline 112 via line 113. Each of the four pipelines is, in turn, coupled to a level two (L2) cache 104 via 64-bit bi-directional line 105. Thus, 64 bits of information can be transferred per clock cycle.

The L2 cache 104, in turn, is coupled to a main memory 102 via bi-directional line 103. The main memory 102 may be an on-chip memory or an off-chip memory containing a color map similar to that illustrated in FIG. 2. In an exemplary embodiment, the L2 cache 104 of the present invention is a 32-bit memory configured to store both the data relating to overlapping requests to the main memory 102 and the resulting output provided by the main memory 102. In this manner, an individual one or group of pipelines 106-112 can request information be provided thereto by the faster accessing L2 cache 104 instead of obtaining information from the relatively slower main memory 102.

Figure 5:
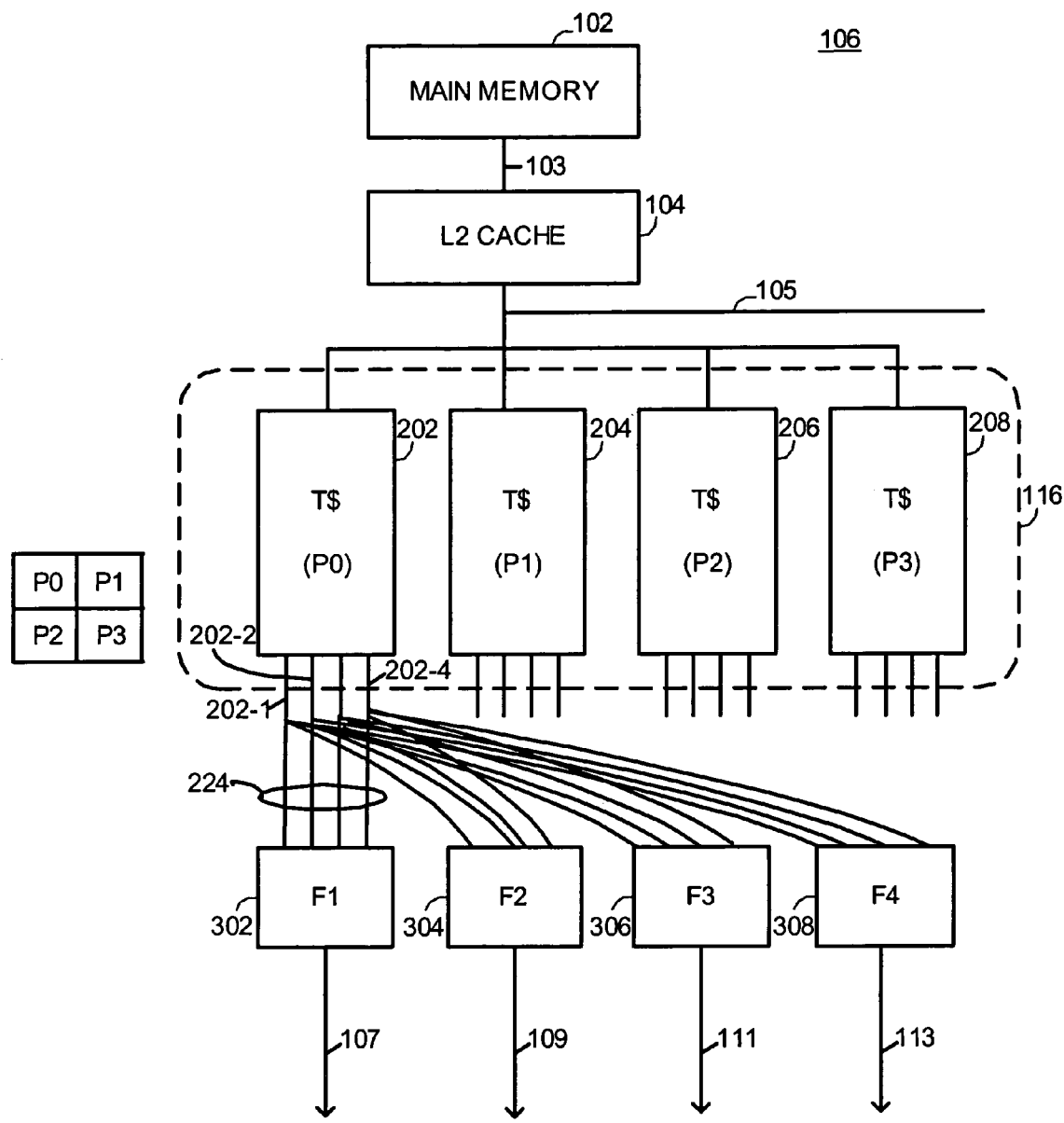
FIG. 5 is an exploded schematic block diagram of the pipeline structure of the graphics processor illustrated in FIG. 4.

FIG. 5, illustrates an exploded schematic block diagram of the first pipeline 106 and its interconnection to the L2 cache 104 according to the present invention. Pipelines 108, 110 and 112 are configured similarly to pipeline 106 and are connected in similar fashion as pipeline 106 and will therefore not be discussed further herein so as not to obscure the discussion of the present invention. As shown in FIG. 5, the first pipeline 106 is comprised of a plurality of 2 KByte texture caches 202-208 which maintain, for example, appearance attribute data therein. The plurality of texture caches 202-208 comprise the level one (L1) cache 116 of the present invention. The plurality of texture caches 202-208 are coupled to the larger L2 cache 104 via 64-bit bi-directional line 105. The corresponding texture caches 202-208 have substantially identical structures; thus, only texture cache 202 will be described in greater detail herein.

Texture cache 202 includes a plurality of pins 202-1 through 202-4 which are coupled to a respective plurality of fetch blocks 302-308 of the memory structure via line 224. More specifically, pin 202-1 is coupled to each of the corresponding fetch blocks 302-308. Pin 202-2 is also coupled to each of the respective fetch blocks 302-308. Similarly, pin 202-3 is also coupled to each of the individual fetch blocks 302-308. And in like manner, pin 202-4 is coupled to each of the fetch blocks 302-308. Texture caches 204-208 are coupled to the plurality of fetch blocks similar to that disclosed with reference to texture block 202.

With brief reference to FIGS. 1 and 2, if a request is made for the color attribute to be applied to pixel P0, the information from texture tile 14, namely texels T2, T4, T6 and T7 would be requested by fetch block 302 with such corresponding pixel information being maintained in texture caches 202-208 in corresponding order. In other words, the texture information for pixel P0 will be transferred to first texture cache 202; the texture information for pixel P1 will be transferred to second texture cache 204; the texture information for pixel P2 will be transferred to third texture cache 206 and the texture information for pixel P3 will be transferred to fourth texture cache 208. After the texture data has been transferred to the plurality of texture caches comprising the L1 cache, the requested information regarding, in this example, pixel P2 is then transferred from texture cache 206 to fetch block 302.

After the fetch block 302 requests the information relating to pixel P2, the information relating to pixels P0-P3 are transferred from the main memory 102 into the L2 cache 104, via line 103, for storage. Once received, the information relating to pixel tile 14 is then transmitted to the appropriate texture cache (i.e. texture cache 206) for transfer to the requesting fetch block 302. The requested information is then transferred to the graphics controller 140 on line 107 for application to the point of interest.

Contemporaneously with the request from fetch block 302, or subsequent to such fetch request, another pipeline (i.e. third pipeline 110) may request information relating to the color value to be applied to pixel P1 (FIG. 1). When such a request arises, the request is transmitted to the L1 cache within the corresponding pipeline (i.e. third pipeline 110). If the information relating to corresponding pixel tile 16 is not located within the L1 cache of the third pipeline 110, a request is then made to the L2 cache 104 for such information. As discussed above, the color data relating to texel T2 is present in the L2 cache 104, as a result of the previous request from fetch block 302. Thus, the information relating to texel T2 is transmitted to the requesting fetch block in the third pipeline 110. In addition, if the data relating to the remaining texels (T0, T1 and T3) of texture tile 16 is located in the L2 cache 104, such data is also transmitted to the requesting pipeline. On the other hand, if the information is not located within the L2 cache 104, a request to main memory 102 is performed wherein the resulting data values are then transferred on line 103 into the L2 cache 104 for subsequent transfer to the requesting pipeline 110 and stored therein for any subsequent processes.

Thus, as illustrated in the above example, the overlapping value of texel T2 is retrieved directly from the L2 cache 104. This process of obtaining overlapping texel information from the L2 cache is performed in conjunction with every pixel. As such, the information relating to the overlapping information is quickly provided to the requesting process. In this fashion, graphics processor time is more efficiently utilized as time is not spent waiting for the main memory 102 to be accessed. In this fashion, overall computational efficiency of the graphics processor is enhanced.

The above detailed description of the present invention and the examples described therein have been presented for the purposes of illustration and description. It is therefore contemplated that the present invention cover any and all modifications, variations or equivalents that fall within the spirit and scope of the basic underlying principles disclosed and claimed herein.

What is claimed is:

1. A memory architecture comprising:
   a plurality of level one caches each comprising texel information and each associated with a corresponding graphics pipeline of a plurality of graphics pipelines;
   a common level two cache, operatively coupled to each of the plurality of level one caches, that comprises overlapping fetched texel information resulting from execution of previous memory fetch instructions, wherein the previous memory fetch instructions resulted in storage of requested texel information in at least one corresponding level one cache of the plurality of level one caches;
   wherein when a particular level one cache of the plurality of level one caches does not comprise overlapping fetched texel information requested by a subsequent memory fetch instruction, the level two cache is operative to transmit the overlapping fetched texel information requested by the subsequent memory fetch instruction to the particular level one cache of the plurality of level one caches; and
   wherein the subsequent memory fetch instruction results in storage of requested texel information at least in the particular level one cache of the plurality of level one caches.

2. The memory architecture of claim 1, wherein:
   each level one cache of the plurality of level one caches comprises a plurality of texture cache blocks; and
   wherein one of the plurality of texture cache blocks is operative to receive the subsequent texel fetch instruction.

3. The memory architecture of claim 1, further comprising:
   a main memory operatively coupled to the level two cache; and
   wherein when the particular level one cache of the plurality of level one caches and the level two cache do not comprise texel information requested by a second subsequent memory fetch instruction, the main memory is operative to transmit the texel information requested by the second subsequent memory fetch instruction to the level two cache for storage.

4. The memory architecture of claim 3, wherein the level two cache transmits the texel information requested by the second subsequent texel fetch instruction to the particular level one cache of the plurality of level one caches for storage.

5. A graphics processing device, comprising:
   a graphics controller operative to execute memory fetch instructions;
   a main memory;
   a plurality of level one caches each coupled to the graphics controller, each comprising texel information, and each associated with a corresponding graphics pipeline of a plurality of graphics pipelines; and
   a level two cache coupled between the main memory and the plurality of level one caches, the level two cache comprising overlapping fetched texel information resulting from execution of previous memory fetch instructions, wherein the previous memory fetch instructions resulted in storage of requested texel information in at least one corresponding level one cache of the plurality of level one caches;
   wherein when a particular level one cache of the plurality of level one caches does not comprise overlapping fetched texel information requested by a subsequent memory fetch instruction, the level two cache transmits the overlapping fetched texel information requested by the subsequent memory fetch instruction to the particular level one cache of the plurality of level one caches; and
   wherein subsequent memory fetch instruction results in storage of requested texel information at least in the particular level one cache of the plurality of level one caches.

6. The graphics processing device of claim 5, wherein the graphics controller is operative to request the subsequent memory fetch instruction.

7. The graphics processing device of claim 6, wherein the graphics controller comprises a plurality of fetch blocks, wherein one of the plurality of fetch blocks is operative to request the subsequent memory fetch instruction.

8. The graphics processing device of claim 6, wherein the particular level one cache of the plurality of level one caches transmits the overlapping fetched texel information requested by the subsequent memory fetch instruction to the graphics controller.

9. The graphics processing device of claim 5, wherein each of the plurality of level one caches comprises a plurality of texture cache blocks; and wherein one of the plurality of texture cache blocks is operative to receive the subsequent texel fetch instruction.

10. The graphics processing device of claim 5, wherein when the particular level one cache of the plurality of level one caches and the level two cache do not comprise texel information requested by a second subsequent memory fetch instruction, the main memory is operative to transmit the texel information requested by the second subsequent memory fetch instruction to the level two cache for storage.

11. The graphics processing device of claim 10, wherein the level two cache transmits the texel information requested by the second subsequent texel fetch instruction to the particular level one cache of the plurality of level one caches for storage.

* * * * *